US012812675B2

United States Patent

(12) United States Patent
Löhr et al.

(10) Patent No.: US 12,812,675 B2
(45) Date of Patent: Nov. 24, 2026

(54) APPARATUSES, METHODS, AND SYSTEMS FOR CONTROLLING LISTEN-BEFORE-TALK MODE SWITCHING

(71) Applicant: Lenovo (Singapore) Pte. Ltd., New Tech Park (SG)

(72) Inventors: Joachim Löhr, Wiesbaden (DE); Ankit Bhamri, Rödermark (DE); Karthikeyan Ganesan, Kronberg im Taunus (DE); Prateek Basu Mallick, Dreieich (DE); Alexander Golitschek Edler von Elbwart, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 277 days.

(21) Appl. No.: 18/699,558

(22) PCT Filed: Oct. 10, 2022

(86) PCT No.: PCT/IB2022/059705

§ 371 (c)(1),
(2) Date: Apr. 8, 2024

(87) PCT Pub. No.: WO2023/058008

PCT Pub. Date: Apr. 13, 2023

(65) Prior Publication Data

US 2024/0406997 A1 Dec. 5, 2024

Related U.S. Application Data

(60) Provisional application No. 63/253,626, filed on Oct. 8, 2021.

(51) Int. Cl.
*H04W 4/00* (2018.01)
*H04W 74/0808* (2024.01)

(52) U.S. Cl.
CPC .............................. *H04W 74/0808* (2013.01)

(58) Field of Classification Search
CPC ............ H04W 74/0808; H04W 74/08; H04W 72/046; H04W 72/0446; H04W 72/232; H04W 16/14; H04B 7/0408; H04L 5/0053
(Continued)

(56) References Cited

U.S. PATENT DOCUMENTS

2015/0365830 A1* 12/2015 Wei .................. H04W 72/0453 370/280
2019/0335504 A1* 10/2019 Chakraborty ......... H04W 16/14
(Continued)

OTHER PUBLICATIONS

PCT/IB2022/059705, "Notification of Transmittal of the International Search Report and the Written Opinion of the International Searching Authority, or the Declaration", International Searching Authority, Jan. 17, 2023, pp. 1-19.
(Continued)

*Primary Examiner* — Temica M Beamer
(74) *Attorney, Agent, or Firm* — Kunzler Needham Hilton

(57) ABSTRACT

Apparatuses, methods, and systems are disclosed for transmission mode switching. One embodiment of a method includes initiating a counter corresponding to a LBT related event based on an LBT condition. The method also includes performing a predefined number of LBT based uplink transmissions. The method also includes switching to no-LBT based uplink transmissions based on the counter having a value greater than a threshold value after the predefined number of LBT based uplink transmissions are performed.

20 Claims, 6 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2020/0351940 | A1 | 11/2020 | Deogun et al. | |
| 2021/0153245 | A1* | 5/2021 | Tooher .............. | H04W 72/0453 |
| 2021/0204318 | A1* | 7/2021 | Babaei .................. | H04W 76/11 |
| 2021/0204321 | A1 | 7/2021 | Babaei | |

OTHER PUBLICATIONS

"RAN1 Chairman's Notes", 3GPP TSG RAN WG1 Meeting #103-e, Oct. 26-Nov. 13, 2020, pp. 1-108.

Samsung, "Session notes for 7.2.6 (Maintenance of Enhancements on MIMO for NR)", 3GPP TSG RAN WG1 Meeting #104bis-e R1-210xxxx, Apr. 12-20, 2021, pp. 1-1.

"RAN1 Chair's Notes", 3GPP TSG RAN WG1 Meeting #105-e, May 10-27, 2021, pp. 1-57.

Qualcomm Inc., "Email discussion on channel access mechanism for 52.6GHz-71GHz band", 3GPP TSG RAN WG1 Meeting #102-e R1-200xxxx, Aug. 17-24, 2020, pp. 1-22.

Qualcomm, "New WID on Extending current NR operation to 71 GHz", 3GPP TSG RAN Meeting #86 RP-193229, Dec. 9-12, 2019, pp. 1-5.

Intel Corp., "New SID: Study on supporting NR from 52.6GHz to 71 Ghz", 3GPP TSG RAN Meeting #86 RP-193259, Dec. 9-12, 2019, pp. 1-3.

3GPP, "3rd Generation Partnership Project; Technical Specification Group Radio Access Network; Study on NR-based access to unlicensed spectrum (Release 16)", 3GPP TR 38.889 V16.0.0, Dec. 2018, pp. 1-119.

3GPP, "3rd Generation Partnership Project; Technical Specification Group Radio Access Network; NR; Physical channels and modulation (Release 16)", 3GPP TS 38.211 V16.7.0, Sep. 2021, pp. 1-134.

* cited by examiner

APPARATUSES, METHODS, AND SYSTEMS FOR CONTROLLING LISTEN-BEFORE-TALK MODE SWITCHING

CROSS-REFERENCE TO RELATED APPLICATIONS

This application claims priority to U.S. Patent Application Ser. No. 63/253,626 entitled "APPARATUSES, METHODS, AND SYSTEMS FOR LAYER 2 ASPECTS FOR SWITCHING LBT MODE" and filed on Oct. 8, 2021 for Joachim Löhr, which is incorporated herein by reference in its entirety.

FIELD

The subject matter disclosed herein relates generally to wireless communications and more particularly relates to apparatuses, method, and systems for controlling listen-before-talk ("LBT") mode switching.

BACKGROUND

In certain wireless communications networks, an LBT mode may be used despite degraded performance.

BRIEF SUMMARY

Methods for channel access mode switching are disclosed. Apparatuses, systems, and network entities also perform the functions of the methods. One embodiment of a method includes initiating a counter corresponding to a LBT related event based on an LBT condition. The method also includes performing a predefined number of LBT based uplink transmissions. The method also includes switching to no-LBT based uplink transmissions based on the counter having a value greater than a threshold value after the predefined number of LBT based uplink transmissions are performed.

One apparatus for performing LBT mode switching includes a processor and a memory coupled to the processor. The processor is configured to initiate a counter corresponding to an LBT related event based on an LBT condition, perform a predefined number of LBT based uplink transmissions, and switch to no-LBT based uplink transmissions based on the counter having a value greater than a threshold value after the predefined number of LBT based uplink transmissions are performed.

Another method performed by a network entity includes transmitting a request via the transceiver to a user equipment ("UE") to request that the UE transmit LBT statistics, receiving via the transceiver receive the LBT statistics, generating a threshold corresponding to the LBT statistics, and transmitting the generated threshold to the UE.

Another apparatus includes a processor and a memory coupled with the processor. The processor configured to cause the apparatus to transmit a request via the transceiver to a UE to request that the UE transmit LBT statistics, receive via the transceiver receive the LBT statistics, generate a threshold corresponding to the LBT statistics, and transmit the generated threshold to the UE.

BRIEF DESCRIPTION OF THE DRAWINGS

A more particular description of the embodiments briefly described above will be rendered by reference to specific embodiments that are illustrated in the appended drawings.

Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
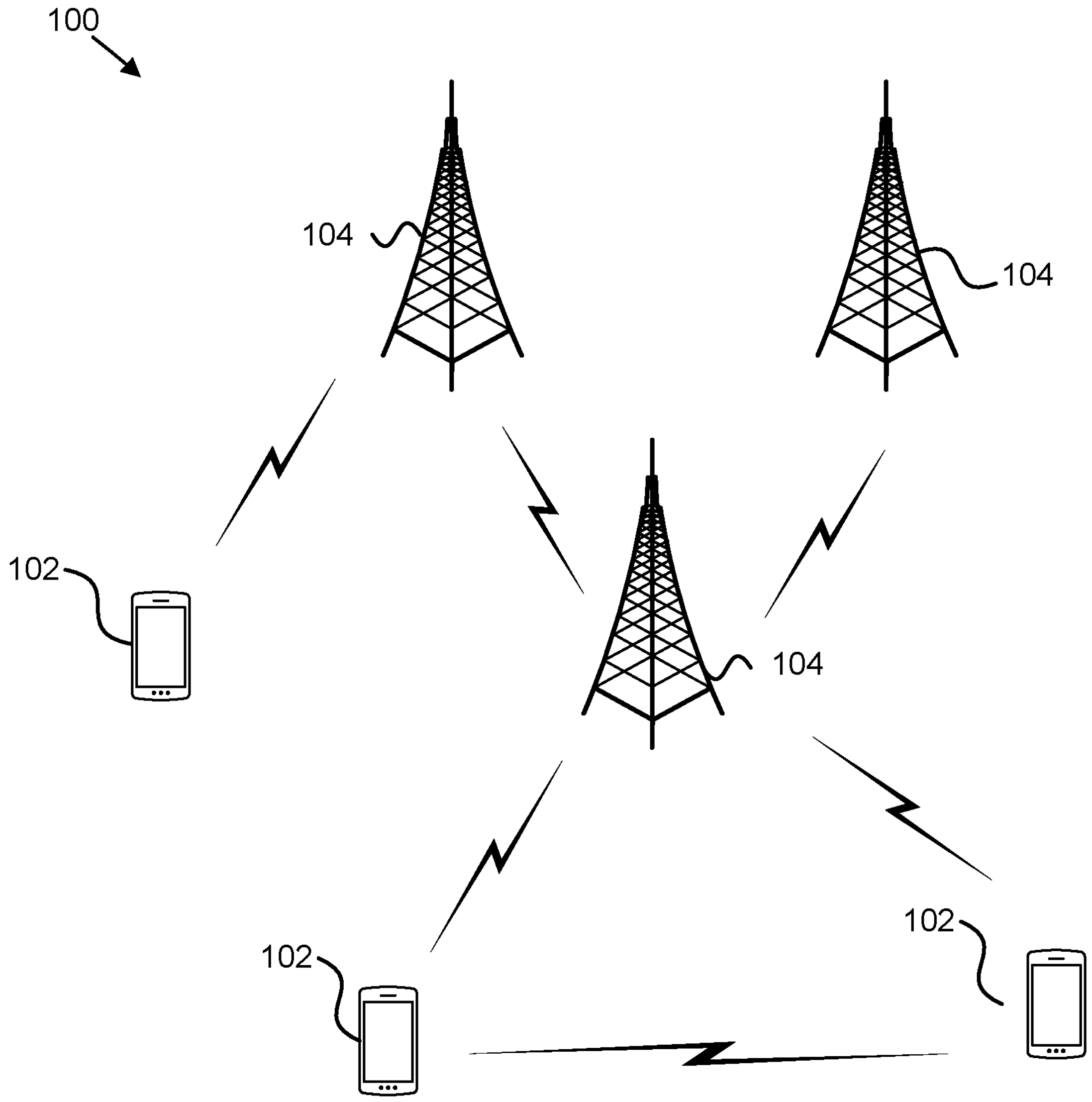
FIG. 1 is a schematic block diagram illustrating one embodiment of a wireless communication system for controlling LBT mode switching.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for layer 2 aspects for switching listen-before-talk ("LBT") mode. In one embodiment, the wireless communication system 100 includes remote units (user equipments ("UEs")) 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit ("gNB") 104 may also be referred to as an access point, an access terminal, a base, a base station, a Node-B, an eNB, a gNB, a Home Node-B, a relay node, a device, a core network, an aerial server, a network ("NW") entity, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the $3^{rd}$ generation partnership project ("3GPP") protocol, wherein the network unit 104 transmits using an orthogonal frequency division multiplex ("OFDM") modulation scheme on the download ("DL") and the remote units 102 transmit on the UL using a single carrier ("SC")-frequency division multiple access ("FDMA") scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

The remote unit/UE 102 performs LBT mode switching and includes a processor and a memory coupled to the processor. The processor is configured to initiate a counter corresponding to an LBT related event responsive to an LBT condition, perform a predefined number of LBT based uplink transmissions, and switch to no-LBT based uplink transmissions responsive to the counter having a value greater than a threshold value after the predefined number of LBT based uplink transmissions are performed.

Figure 2:
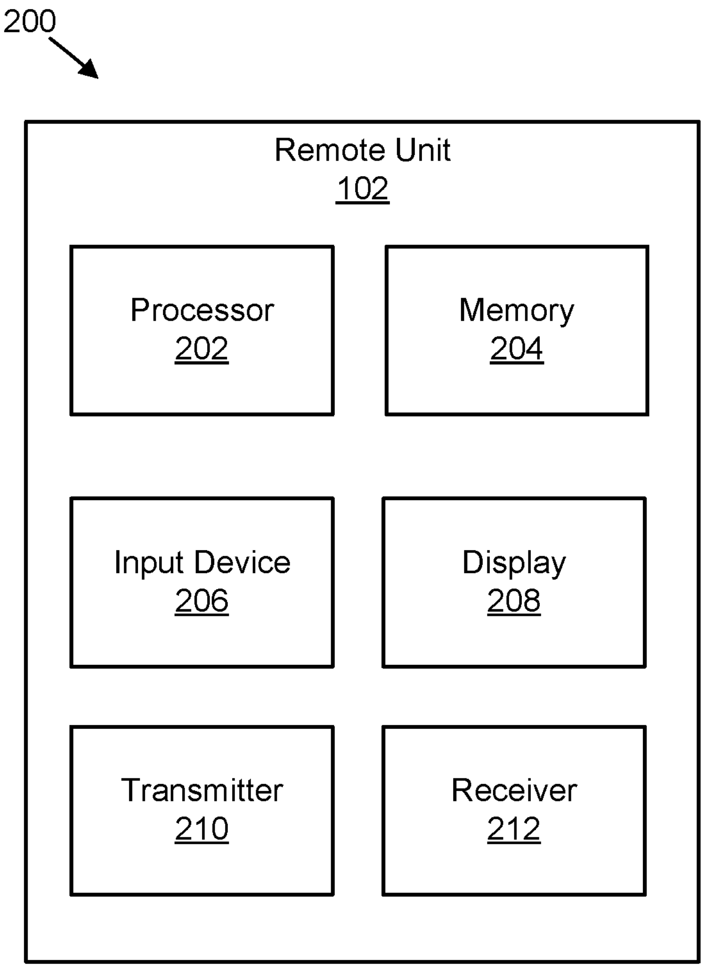
FIG. 2 is a schematic block diagram illustrating one embodiment of an apparatus that may be used for switching LBT mode.

FIG. 2 depicts one embodiment of an apparatus 200 that may be used for layer 2 aspects for switching LBT mode. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The transmitter 210 is used to provide UL communication signals to the network unit 104 and the receiver 212 is used to receive DL communication signals from the network unit 104, as described herein. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
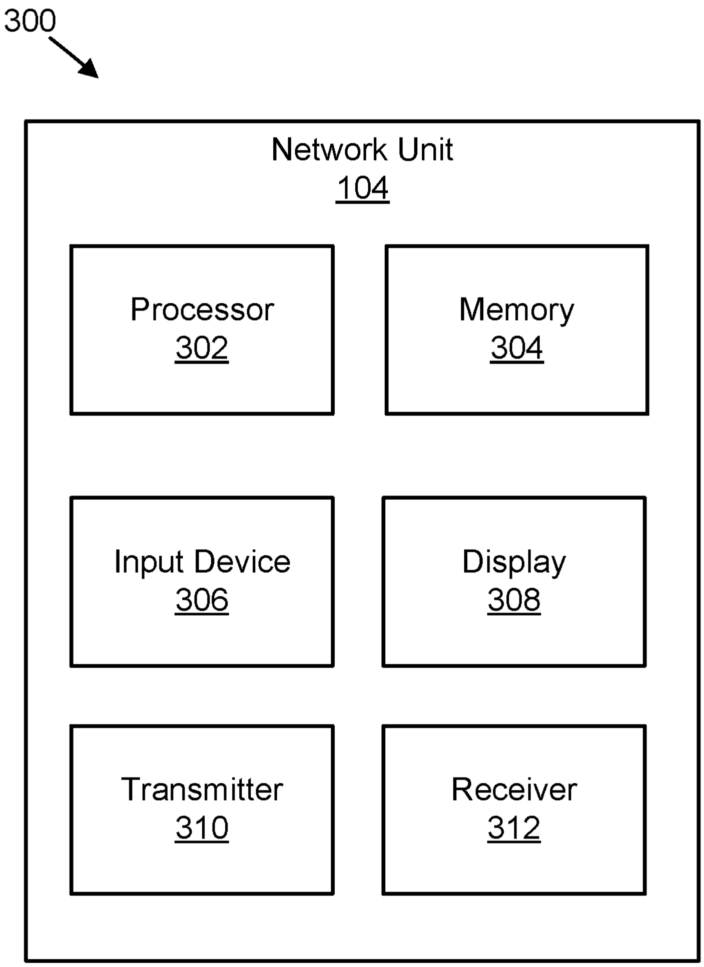
FIG. 3 is a schematic block diagram illustrating another embodiment of an apparatus that may be used for switching LBT mode.

FIG. 3 depicts one embodiment of an apparatus 300 that may be used for layer 2 aspects for switching LBT mode. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 (or a transceiver) are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

The processor 302 is configured to cause the gNB 104 to transmit a request via the transmitter 310 to a user equipment ("UE") to request that the UE transmit listen-before-talk ("LBT") statistics, receive via the receiver 312 receive the LBT statistics, generate a threshold corresponding to the LBT statistics, and transmit the generated threshold to the UE 102.

In countries where LBT is not mandated, there are companies proposing to use no-LBT type transmission. However, to maintain coexistence with Wi-Fi and other operators, usage of LBT is still preferable. Companies proposed operation of no-LBT mode when there is less interference and fallback mode of switching from no-LBT to LBT. In more recent radio access network ("RAN") standards, agreement has occurred to indicate to the UE 102 whether LBT or no-LBT is applied.

Detailed layer 2 protocol behavior, when supporting a dynamic channels access mechanism for regions where LBT is not mandated, i.e. switching between LBT and no-LBT mode, is currently unclear. Some undesired UE, medium access control ("MAC"), or (MAC-control element ("CE")) behavior may occur when switching from LBT to no-LBT mode. Furthermore, when supporting a procedure where the UE 102 autonomously determines a channel access scheme, i.e. LBT mode, the UE 102 and the gNB 104 are synchronized to the current used channel access mode (the LBT mode), since the LBT mode will have some impact on scheduling decisions by the gNB 104. The MAC or MAC-CE are stored in the memory 204 and executable by the processor 202.

In various embodiments, the UE 102 informs the gNB 104 about the current used LBT mode whenever the UE 102 autonomously switches the channel access mechanism based on some predefined criteria. In order to ensure that the interference level is low when autonomously switching to the no-LBT mode based on some measured antenna performance (e.g., directivity or antenna gain) exceeding a predefined measurement threshold, the UE 102 still performs LBT for the first x number of uplink ("UL") transmissions. In case the number of LBT (transmission) failures exceeds a preconfigured threshold, the UE 102 continues to apply LBT for the corresponding beam, spatial filter, or serving cell even though the directivity or antenna gain is high (exceeding the predefined threshold). The UE 102 switches to the no-LBT mode for the beam, the spatial filter, or the serving cell in response to a counter exceeding x and LBT failures are below the preconfigured threshold.

In various embodiments, the UE 102 switches to the no-LBT mode when the directivity or antenna gain exceeds a predefined threshold. However, even though the directivity gain might be sufficiently high, an UL transmission may still experience significant interference, for example, when the sensing beam has a different (larger) beam width than the transmitting beam. Therefore, applying an additional transient period where the UE 102 is still performing LBT for a predefined x number of UL transmission ensures that no-LBT mode is only applied when the interference for UL transmissions is sufficiently low.

In various embodiments, MAC protocol operation related to LBT for new radio ("NR") operating in high frequency bands beyond 52 GHz, e.g., up to 71 GHz are disclosed. In particular the procedure and signaling details are proposed for dynamic LBT channel access mode support (switching from LBT to no-LBT and vice versa).

In various embodiments, a UE-initiated channel occupancy is shared (either configured grant ("CG")-physical uplink shared channel ("PUSCH") or scheduled UL) with the gNB 104, such that the gNB 104 is allowed to transmit control, or broadcast signals or channels for any the UEs 102 as long as the transmission contains transmissions for the UE 102 that initiated the channel occupancy and/or DL signals/channels (physical downlink shared channel ("PDSCH"), physical downlink control channel ("PDCCH"), reference signals ("RS")) meant for the UE 102 that initiated the channel occupancy.

In various embodiments, the UE 102 initializes the LBT counter, which counts LBT failures indicated by lower layer, to zero when switching the LBT mode to "LBT". A counter is set to zero when switching from no-LBT to LBT mode. A LBT counter associated with a beam or a spatial filter is initialized to zero when the channel access mechanism for the beam or the spatial filter is switched to the LBT mode. Assumption is that LBT failure handling, e.g. counting LBT failures, is done per beam or per spatial filter.

In various embodiments, the UE 102 keeps the LBT counter, which counts LBT failures indicated by lower layer, unchanged when switching from "LBT" to "no-LBT". The counter is kept and not set to zero when switching from LBT to no-LBT mode. The LBT counter associated with a beam or spatial filter is kept and not set to zero when the LBT mode for the beam or spatial filter is switched to the no-LBT mode. The assumption is that LBT failure handling, e.g. counting LBT failures, is done per beam or per spatial filter. Since no LBT failure indications will be received from lower layer ("PHY"), a failure detection timer will eventually expire which in turn resets the LBT counter to zero. In one embodiment, when the UE 102 applies LBT mode for one set of beams and no-LBT mode for another set of beams, then LBT counter is maintained only for the beams for which LBT mode is enabled. In some implementations, the UE 102 keeps overall LBT counter in addition to per beam or per spatial filter counter. There could be a beam specific LBT counter and a MAC specific LBT counter. For example, the counter which is responsible for determining consistent LBT failures (and triggering recovery procedure) may be defined by a MAC entity or a serving cell whereas the LBT failure counter is defined per beam.

In various embodiments, the UE 102 considers an LBT failure recovery configuration for a serving cell as deconfigured by upper layers, in response to switching from LBT to no-LBT for the serving cell. According to one implementation of this embodiment the UE 102 indicates to upper layer the LBT mode switch from LBT to no-LBT mode and upper layer in turn deconfigure the LBT failure recovery configuration. In another implementation of this embodiment the UE 102 does not inform upper layer about the LBT mode switch, but instead behaves as if the LBT failure recovery configuration would have not been configured by upper layer or NW. As a consequence, the UE 102 cancels all triggered LBT failures in this serving cell.

In various embodiments, the UE 102 considers the LBT failure recovery configuration for a serving cell as deconfigured by upper layers, when all (serving) active beams in the serving cell are in no-LBT mode. Assumption for this implementation is, that LBT failure handling and LBT mode is defined/maintained per (serving) beam. Only for the case that all active/serving beams/spatial filters of a serving cell are in no-LBT mode, the UE 102 deconfigures the LBT failure recovery configuration, e.g. the UE 102 considers the LBT failure recovery configuration as not been configured. For cases that some of the active/serving beams of the UE 102 are still in LBT mode for the serving cell, the UE 102 will not cancel the triggered consistent LBT failure(s) for the serving cell. The UE 102 may only cancel a triggered consistent LBT failure for a serving cell when the beam or the spatial filter for which consistent LBT failure was triggered switched to "no-LBT" mode. Here the assumption is that consistent LBT failure is triggered per beam or per spatial filter.

For cases where the UE 102 cancels all triggered consistent LBT failure(s) for a serving cell in response to all beams/spatial filter of the serving cell are in no-LBT mode or the serving cell is switched to no-LBT mode, the UE 102 removes the LBT failure MAC CE from a transport block ("TB") for cases that the TB has been already generated but uplink transmission hasn't been performed yet. Instead of transmitting the LBT failure MAC CE UE may multiplex some other MAC sub protocol data unit ("PDU") with higher layer data or padding or buffer status report ("BSR") MAC CE in the TB.

In various embodiments, the UE 102 continues with autonomous retransmission(s) for a hybrid automatic repeat request ("HARQ") process even upon switching the LBT mode from LBT to no-LBT. For cases when a CG retransmission timer is running for a HARQ process or a HARQ process state is pending, the UE 102 continues with an autonomous retransmission even after the LBT mode has been switched to no-LBT mode for the serving cell or for an associated beam or spatial filter. Such situation may happen when LBT mode changed to "no-LBT" before the transmission occasion for an autonomous retransmission, i.e., LBT fails for initial transmission on CG PUSCH and afterwards, the UE 102 switches from LBT to no-LBT mode for the beam or the cell. Alternatively, the UE 102 may not perform pending autonomous retransmission upon change of the LBT mode from LBT to no-LBT mode. According to one embodiment, the UE 102 considers the CG retransmission timer as not configured when each of the serving/active beams of a serving cell is in "no-LBT" mode.

In various embodiments, the UE 102 may consider CG-uplink control information ("UCI") as not configured in the no-LBT mode otherwise deactivate the CG resource configured with CG-UCI when switched to no-LBT mode.

In various embodiments, all HARQ processes shall be not in a pending state when each serving/active beam/spatial filter of a serving cell are in no-LBT mode respectively if a serving cell is in no-LBT mode, i.e. there shall be no HARQ process in a pending state (UE/MAC considers all HARQ processes as "not pending").

In various embodiments, the UE 102 computes statistics about LBT failures per beam or per spatial filter or per serving cell. In one non-limiting example, such statistics may encompass a measure of LBT failures or consistent LBT failures measured over a preconfigured time period or an LBT failure to success ratio. The UE 102 may report the computed LBT statistics to a NW entity such as the gNB 104 in order to allow the gNB 104 to determine and configure a LBT mode, i.e. LBT or no-LBT. Such a report may be done by the MAC-CE or by using radio resource control ("RRC") signaling, e.g., the UE assistance information message. In one non-limiting example, long term LBT failure statistics measured in a configured window duration which is defined in terms of slots, msec per beam, per spatial, or per serving cell are compared against a configured threshold and if the LBT failure statistic is below the configured threshold for a beam, a spatial filter, or a serving cell, then the gNB 104 could switch the beam, the spatial filter, or the serving cell from LBT to no-LBT mode. The gNB 104 may configure a threshold against which the UE 102 compares the gathered LBT statistics. Such threshold may be either broadcasted or provided by dedicated signaling. In case the measured LBT failures statistics are below the threshold, the UE 102 may autonomously switch to the no-LBT mode for a beam, spatial filter, or serving cell.

In various embodiments, spatial directivity gain or antenna gain measured for a beam or a spatial filter may be used as a metric for determining the LBT mode of a beam, a spatial filter, or a serving cell. The UE 102 may compare the measured spatial directivity gain or antenna gain against a configured or predefined threshold. For cases that the measured directivity or antenna gain is above the configured threshold, the UE 102 switches to the no-LBT mode for the corresponding beam, spatial filter, or serving cell.

In various embodiments, the UE 102 switches to the no-LBT mode for the corresponding beam, spatial filter, or serving cell only in case all of the HARQ process are in the "not pending" state, e.g. no pending autonomous retransmission.

In various embodiments, the UE 102 initializes a new counter which is counting the LBT failures informed from lower layers in response to the measured directivity or antenna gain exceeding the configured threshold. The UE 102 performs LBT procedure for the following preconfigured number x UL transmissions. The UE 102 increases the counter by one for every indicated LBT failure. In case the counter exceeds a preconfigured threshold, the UE 102 continues to apply LBT, i.e., LBT mode, for the corresponding beam, spatial filter, or serving cell. In case the counter is less than the threshold for the configured number of uplink transmissions the UE 102 switches to the no-LBT mode for the beam, the spatial filter, or the serving cell. In one specific implementation the UE 102 switches to the no-LBT mode for the beam, the spatial filter, or the serving cell in case no LBT failures were indicated for the configured number of uplink transmissions. One reasoning why the UE 102 applies this additional transient period in addition to the directivity gain metric is that a sensing beam could have a different beam width than the transmitting beam.

In various embodiments, when the UE 102 is configured to transmit with multiple beams and LBT mode is enabled, a single LBT counter is configured and maintained, where the counter is incremented by one when all the beams have energy (interference) detected above a certain energy threshold. The UE 102 performs LBT procedure for the following preconfigured number x uplink transmissions. the UE 102 increases the counter by one for every indicated LBT failure. In case the counter exceeds a preconfigured threshold, the UE 102 continues to apply LBT, i.e., LBT mode, for the corresponding serving cell. In case the counter is less than the threshold for the configured number of uplink transmissions the UE 102 switches to the no-LBT mode for the corresponding serving cell. The gNB 104 configures the preconfigured number x uplink transmissions. The number x value could be set according to the deployment case for example. In a controlled environment the number could be set to a low value since only low interference is expected.

In various embodiments, counting the number of non-acknowledgements ("NACKs") or missing HARQ feedback ("DFI") from the NW for a configured number of uplink ("PUSCH") transmissions instead of LBT failures is used as a metric for the UE 102 autonomous switching the LBT mode. UE initializes a new counter which is counting the NACKs or missing HARQ feedbacks (downlink feedback indicator (DFI)) in response to the measured directivity or antenna gain exceeding a configured threshold. The UE 102 performs LBT procedure for the following preconfigured number x uplink (PUSCH) transmissions. the UE 102 increases the counter by one for every indicated NACK or missing HARQ feedback. In case the counter exceeds a preconfigured threshold, the UE 102 continues to apply LBT, i.e. LBT mode, for the corresponding beam, spatial filter, or serving cell. In case the counter is less than the threshold for the configured number of uplink transmissions the UE 102 switches to the no-LBT mode for the beam, the spatial filter, or the serving cell.

In various embodiments, consecutive NACKs or missing HARQ feedback (DFI can be a metric for switching to LBT mode.

In various embodiments, consecutive ACKs can be a metric for switching from LBT to no-LBT mode.

In various embodiments, separate scheduling request ("SR") could be configured to enable the UE 102 switch from LBT to no-LBT mode or vice versa. When UE's LBT mode is 'LBT' and when a SR is transmitted by the UE 102 then the gNB 104 could enable switching the UE 102 from LBT to no-LBT mode and similarly when UE's LBT mode is 'no-LBT' then the transmission of SR might change it from no-LBT to LBT mode.

In various embodiments, the UE 102 reports the LBT mode for a beam, a spatial filter, or a serving cell to the NW entity such as the gNB 104. In one implementation the LBT mode information is reported via a new MAC CE. In one example the MAC CE is indicating the LBT mode for each active serving beam or spatial filter of a serving cell. Alternatively, the LBT mode is reported per serving cell. the UE 102 may trigger the transmission of this new LBT mode MAC CE whenever the LBT mode changed for a beam, a spatial filter, or a serving cell. In one specific implementation the UE 102 triggers the transmission of a LBT mode MAC CE whenever the UE 102 autonomously changed the LBT mode of a beam, a spatial filter, or a serving cell. The gNB 104 may request the UE 102 to transmit a LBT mode MAC CE. Such request may be indicated by a one-bit field in a downlink control information ("DCI").

The MAC entity may be configured with one SR configuration which is used for the LBT mode MAC CE. For the LBT mode MAC CE one physical uplink control channel ("PUCCH") resource for SR is configured per bandwidth part ("BWP"). For cases that a LBT mode MAC CE has been triggered and there is no valid uplink resource available the UE 102 triggers an SR on the mapped SR configuration.

In various embodiments, the UE 102 is configured with an LBT configuration which indicates to the UE 102 when to use LBT for uplink transmissions. In one example the LBT configuration orders the UE 102 to perform LBT for every 'xth' uplink transmission for cases when the UE 102 applies the "no-LBT" mode for a serving cell, a beam, or a spatial filter. For cases when LBT fails for one of the configured transmissions, the UE 102 will trigger a procedure where it needs to fulfil other criteria in order to keep using the "no-LBT" mode. In one example the UE 102 needs to receive a preconfigured number n of HARQ ACKs for the subsequent uplink transmissions in order to remain in the "no-LBT" mode. If LBT is successful for the configured transmissions, the UE 102 does not check for number of ACKs or other criteria, i.e. it just performs LBT according to the configuration (every 'xth' transmission).

Figure 4:
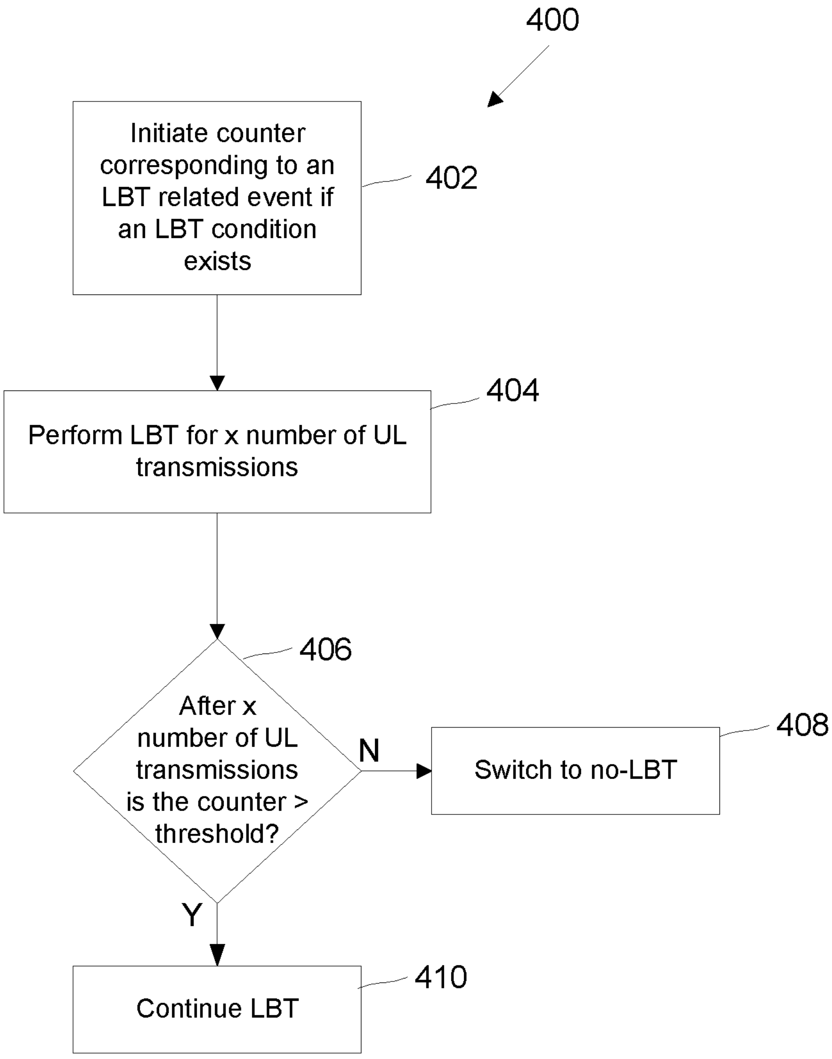
FIG. 4 is a flowchart of a method performed by a user equipment ("UE") for switching LBT mode.

Referring to FIG. 4, a flow diagram of a method 400 performed at a UE. At a block 402, Initiate counter corresponding to an LBT related event if an LBT condition exists. At a block 404, LBT is performed for x number of UL transmissions. At a decision block 406, after the x number of UL transmissions the UE determines if the counter is greater than a threshold. At a block 408, if the counter is not greater than the threshold, the UE switches to no-LBT mode. At a block 410, if the counter is greater than the threshold, the UE continues transmission in the LBT mode.

Figure 5:
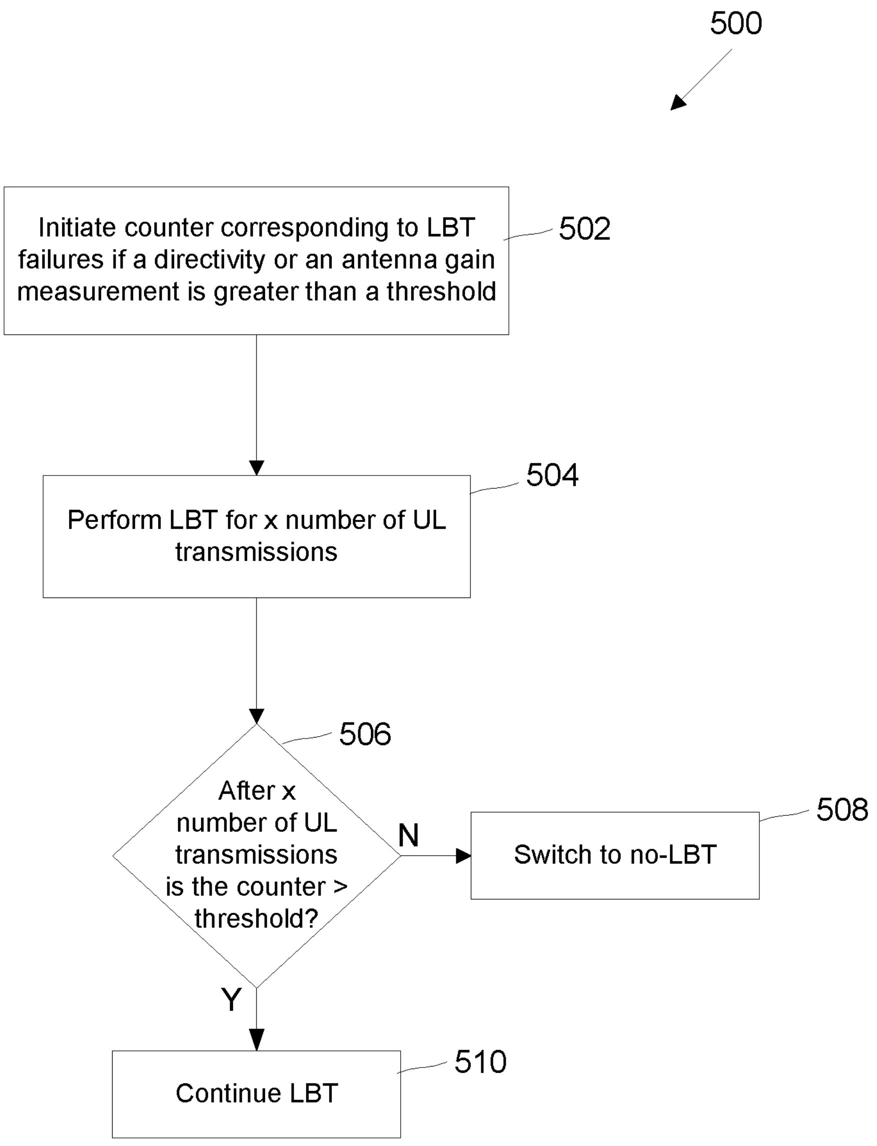
FIG. 5 is a flowchart of a method performed by a UE for switching LBT mode.

Referring to FIG. 5, a flow diagram of a method 500 performed at a UE. At a block 502, the UE initiates a counter corresponding to LBT failures if a directivity or an antenna gain measurement is greater than a threshold. At a block 504, LBT is performed for x number of UL transmissions. At a decision block 506, after the x number of UL transmissions the UE determines if the counter is greater than a threshold. At a block 508, if the counter is not greater than the threshold, the UE switches to no-LBT mode. At a block 510, if the counter is greater than the threshold, the UE continues transmission in the LBT mode.

Figure 6:
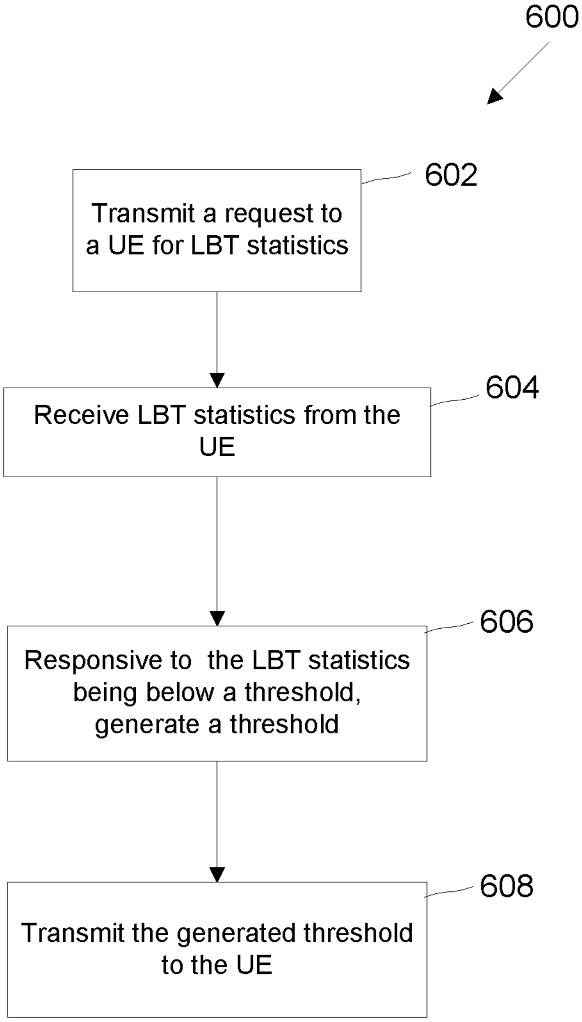
FIG. 6 is a flowchart of a method performed by a network entity for assisting a UE in switching LBT mode.

Referring to FIG. 6, a flow diagram of a method 600 performed at a network entity. At a block 602, the network entity transmits a request to a UE for LBT statistics. At a block 604, the network entity receives the LBT statistics from the UE. At a block 606, the network entity generates a threshold responsive to the LBT statistics being below a threshold value. At a block 608, the network entity transmits the generated threshold to the UE.

A. An apparatus comprising: a processor; and a memory coupled with the processor, the processor configured to: initiate a counter for a listen-before-talk ("LBT") related event; perform one or more uplink transmissions in accordance with LBT; and perform one or more other uplink transmissions irrespective of the LBT based on the counter satisfying a threshold and after the performed one or more uplink transmissions in accordance with the LBT.

B. The apparatus of A, wherein the LBT condition comprises a measurement related to an antenna performance satisfying a measurement threshold.

C. The apparatus of B, wherein the measurement related to the antenna performance comprises a directivity measurement, an antenna gain measurement, or both.

D. The apparatus of any of A-C, wherein the LBT related event comprises an energy of transmitted multiple beams satsifying an energy threshold.

E. The apparatus of any of A-D, wherein the LBT related event comprises a failed uplink transmission in accordance with the LBT.

F. The apparatus of E, wherein the failed uplink transmission comprises a failed uplink transmission per beam, per spatial filter, per serving cell, or a combination thereof.

G. The apparatus of any of A-F, wherein the LBT related event comprises no-acknowledgements ("NACKs"), missing hybrid automatic repeat request ("HARQ") feedbacks, or both.

H. A method at a user equipment ("UE"), the method comprising: based on existence of a listen-before-talk ("LBT") condition: initiating a counter for a LBT related event; performing a one or more uplink transmissions in accordance with LBT; and performing one or more other uplink transmissions irrespective of the LBT based on the counter satisfying a threshold after the performed one or more uplink transmissions in accordance with the LBT.

I. The method of H, wherein the LBT related event comprises a measurement related to an antenna performance satisfying a measurement threshold.

J. The method of I, wherein the measurement related to the antenna performance comprises a directivity measurement, an antenna gain measurement, or both.

K. The method of any of H-J, wherein the LBT related event comprises an energy of transmitted multiple beams satisfying an energy threshold.

L. The method of any of H-K, wherein the LBT related event comprises a failed uplink transmission in accordance with the LBT.

M. The method of L, wherein the failed uplink transmission comprises a failed uplink transmission per beam, per spatial filter, per serving cell, or a combination thereof.

N. The method of any of H-M, wherein the LBT related event comprises no-acknowledgements ("NACKs"), missing hybrid automatic repeat request ("HARQ") feedbacks, or both.

O. An apparatus comprising: a processor; and a memory coupled with the processor, the processor configured to cause the apparatus to: transmit a request to a user equipment ("UE") to request that the UE transmit listen-before-talk ("LBT") statistics; receive the LBT statistics; generate a threshold corresponding to the LBT statistics; and transmit the generated threshold to the UE.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory and configured to cause the UE to:
initiate a counter for a listen-before-talk (LBT) related event based on an LBT condition;
perform a predefined number of LBT based uplink transmissions in accordance with LBT; and
switch to performing one or more no-LBT based uplink transmissions based on the counter having a value greater than a threshold and after the predefined number of LBT based uplink transmissions are performed.

2. The UE of claim 1, wherein the LBT condition comprises a measurement related to an antenna performance satisfying a measurement threshold.

3. The UE of claim 2, wherein the measurement related to the antenna performance comprises a directivity measurement, an antenna gain measurement, or both.

4. The UE of claim 1, wherein the LBT related event comprises an energy of transmitted multiple beams satisfying an energy threshold.

5. The UE of claim 1, wherein the LBT related event comprises a failed uplink transmission in accordance with the LBT.

6. The UE of claim 5, wherein the failed uplink transmission comprises a failed uplink transmission per beam, per spatial filter, per serving cell, or a combination thereof.

7. The UE of claim 1, wherein the LBT related event comprises no-acknowledgements (NACKs), missing hybrid automatic repeat request (HARQ) feedbacks, or both.

8. A method performed by a user equipment (UE), the method comprising:
based on existence of a listen-before-talk (LBT) condition:
initiating a counter for a LBT related event;
performing a predefined number of LBT based uplink transmissions in accordance with LBT; and
switching to performing one or more no-LBT based uplink transmissions based on the counter having a value greater than a threshold and after the predefined number of LBT based uplink transmissions are performed.

9. The method of claim 8, wherein the LBT related event comprises a measurement related to an antenna performance satisfying a measurement threshold.

10. The method of claim 9, wherein the measurement related to the antenna performance comprises a directivity measurement, an antenna gain measurement, or both.

11. The method of claim 8, wherein the LBT related event comprises an energy of transmitted multiple beams satisfying an energy threshold.

12. The method of claim 8, wherein the LBT related event comprises a failed uplink transmission in accordance with the LBT.

13. The method of claim 12, wherein the failed uplink transmission comprises a failed uplink transmission per beam, per spatial filter, per serving cell, or a combination thereof.

14. The method of claim 8, wherein the LBT related event comprises no-acknowledgements (NACKs), missing hybrid automatic repeat request (HARQ) feedbacks, or both.

15. A base station, comprising:
at least one memory; and
at least one processor coupled with the at least one memory and configured to cause the base station to:
transmit a request to a user equipment (UE) to request that the UE transmit listen-before-talk (LBT) statistics;
receive the LBT statistics;
generate a threshold corresponding to the LBT statistics for use by the UE in switching to performing one or more no-LBT based uplink transmissions based on a counter having a value greater than the threshold after the UE performs a predefined number of LBT based uplink transmissions when an LBT condition exists; and transmit the generated threshold to the UE.

16. A processor for wireless communication, comprising:

at least one controller coupled with at least one memory and configured to cause the processor to:

initiate a counter for a listen-before-talk (LBT) related event based on an LBT condition;

perform a predefined number of LBT based uplink transmissions in accordance with LBT; and switch to performing one or more no-LBT based uplink transmissions based on the counter having a value greater than a threshold and after the predefined number of LBT based uplink transmissions are performed.

17. The processor of claim 16, wherein the LBT condition comprises a measurement related to an antenna performance satisfying a measurement threshold.

18. The processor of claim 17, wherein the measurement related to the antenna performance comprises a directivity measurement, an antenna gain measurement, or both.

19. The processor of claim 16, wherein the LBT related event comprises an energy of transmitted multiple beams satisfying an energy threshold.

20. The processor of claim 16, wherein the LBT related event comprises a failed uplink transmission in accordance with the LBT.

* * * * *